Dec. 1, 1959   R. C. BUEHL   2,915,572
ELECTRODE REGULATORS FOR ARC MELTING FURNACES
Filed Jan. 20, 1958
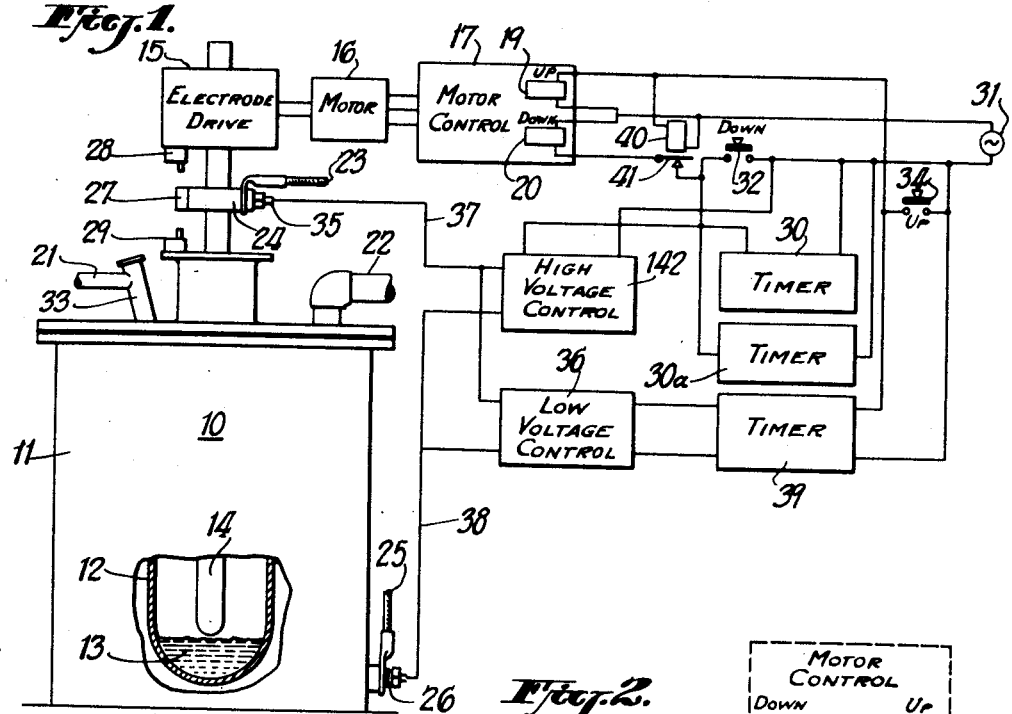
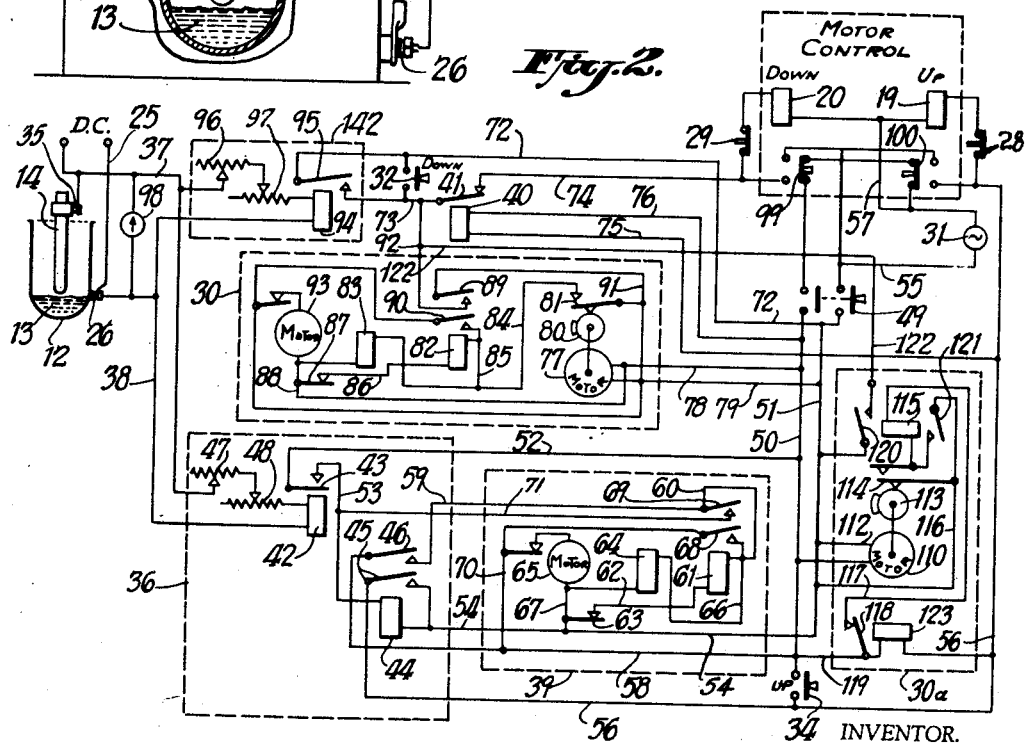
INVENTOR.
RUSSELL C. BUEHL.
BY
ATTORNEYS.

United States Patent Office 2,915,572
Patented Dec. 1, 1959

2,915,572

ELECTRODE REGULATORS FOR ARC MELTING FURNACES

Russell C. Buehl, Beaver, Pa., assignor, by mesne assignments, to Crucible Steel Company of America, Flemington, N.J., a corporation of New Jersey Application January 20, 1958, Serial No. 709,828

14 Claims. (Cl. 13—13)

This invention relates to electrode regulators for arc melting furnaces and particularly to an automatic regulator for maintaining the electrode of a vacuum arc melting furnace in predetermined relationship with the surface of the molten metal in such a furnace.

Arc melting furnaces are well known and usually comprise one or more electrodes extending within a mold or crucible which contains the molten metal. The electrode is connected to one terminal of a power source such as a direct current generator and means are provided for electrically connecting the other terminal of the source to the mold and hence to the molten metal. An arc is struck and maintained between the electrode and the metal, and molten metal is formed due to the heat of the arc and the flow of current through the metal.

Reactive metals, such as titanium and zirconium, usually are melted in vacuum arc melting furnaces, the furnace containing an inert gas, such as argon, under low pressure. Many present day furnaces for melting such reactive metals employ water cooled copper crucibles or molds and a consumable electrode of the metal to be melted, and the melting is done in a vacuum within the range from 1 micron to 20 millimeters of absolute pressure. A short arc gap is desirable to minimize the tendency of the arc to play on the mold wall which may cause puncturing of the mold and also to concentrate the heat of the arc in the metal bath. The arc gap usually is less than two inches in length, and it has been the practice to control the position of the electrode so as to maintain a constant arc voltage drop of about 30 volts. Apparatus for regulating the position of the electrode, which relies upon the arc voltage for regulating purposes, is not completely satisfactory since there is only a small change of arc voltage with arc gap length in the range of gap length normally used in the vacuum arc melting of metals such as titanium and zirconium. Furthermore, the voltage drop across the arc is influenced by variables other than the length of the arc, for example, by volatile impurities in the electrode and the composition and pressure of the gaseous atmosphere. In addition, the arc voltage usually cannot be measured directly, and when the control voltage is derived from a terminal connected to the portion of the electrode extending from the furnace, the control voltage is affected by the voltage drop through the electrode and the voltage drops through the contacts, both of which may vary during the melting of the metal. Consequently, if the electrode is positioned so that a constant voltage is maintained between the electrode support and the molten metal, the length of the arc gap is not necessarily or consistently within the desired range.

If the arc shifts to the wall of the mold, or if the arc strikes at the wall of the mold, the length of the gap between the electrode and the metal should be reduced in order to reduce the arc voltage and to extinguish the arc to the mold wall. However, when the arc extends from the electrode to the wall of the mold, the voltage drop across the arc may be less than the voltage drop when the arc extends properly from the electrode to the metal. Under these conditions, an automatic electrode regulator, which varies the position of the electrode so as to maintain a constant arc voltage drop or ratio of arc voltage to arc current, will move the electrode away from the metal rather than toward the metal, and therefore the eletcrode is moved in a direction exactly opposite to the desired direction.

It will be apparent from the foregoing that a satisfactory automatic arc regulator which is useful in connection with vacuum arc furnaces should be able to maintain a short arc, for example, up to one-half inch in length, independently of changes in arc voltage drop which are caused by volatile impurities and gas composition or pressure. Furthermore, the regulator must not lengthen the arc, and hence, the gap between the electrode and the metal, if an arc forms between the electrode and the wall of the mold.

It has been found from a study of oscillograph records, made during the melting of metals in vacuum arc furnaces, that when a consumable electrode is being melted with a short arc gap, momentary short circuits between the electrode and the metal occur when drops of molten metal are between the electrode and the molten pool or bath of the metal, and such short circuits last from 0.1 to 0.3 second. In addition, the changes in voltage across the arc due to volatile impurities, due to changes in the composition or pressure of the inert gas atmosphere or due to the striking of an arc between the electrode and the wall of the mold are smaller than the voltage changes which occur when drops of the molten metal fall between the electrode and the molten metal bath.

In accordance with the invention, the arc producing electrode is moved steadily or intermittently toward the metal in the mold after the arc is formed. When the electrode is close enough to the metal to permit drops of molten metal to cause momentary short circuits between the electrode and the metal, the electrode is moved away from the metal a predetermined distance, such as from one-quarter of an inch to two inches, and is thereafter again moved toward the metal. The rate at which the electrode is moved toward the metal is greater than the rate at which the electrode is consumed, and preferably, the rate is such that every few seconds the electrode is close enough to the metal to permit momentary short circuits because of the metal droplets. The electrode regulating apparatus is adjusted so that it responds to the relatively large voltage changes produced by the momentary short circuits and so that it will not respond to smaller voltage changes having other causes.

One embodiment of the invention comprises apparatus for continuously moving the electrode toward the metal to be melted, and control apparatus for interrupting and reversing the movement of the electrode. The control apparatus is responsive to relatively large voltage changes and causes the electrode moving apparatus to move the electrode away from the metal a short distance and then permits the electrode moving apparatus to again move the electrode toward the metal.

The preferred embodiment of the invention includes electrode driving apparatus which is controlled by timing means for intermittently moving the electrode toward the metal to be melted, and also includes control apparatus which, responsive to voltage changes of the type produced by momentary short circuits, interrupts movement of the electrode toward the metal and moves the electrode away from the metal a predetermined distance.

It is one object of the invention to provide regulating apparatus which will maintain an arc having a length within a predetermined range in an arc melting furnace which apparatus is independent of certain varying conditions encountered in such furnaces.

It is a further object of the invention to provide automatic regulating apparatus which will not move the electrode of an electric arc furnace away from the material being melted whenever the arc shifts from such material to the wall of the crucible or mold containing the metal which has been melted.

Other objects and advantages will be apparent from the following detailed description of the manner in which I now prefer to practice the invention, which description should be considered in connection with the accompanying drawing in which:

Fig. 1 is a combined block and electrical circuit diagram of one embodiment of the invention; and Fig. 2 is an electrical circuit diagram of one embodiment of regulating apparatus of the invention.

Although the regulating apparatus of the invention may be employed with other types of electric arc furnaces, Fig. 1 illustrates the regulating of the apparatus of the invention in association with a conventional arc melting furnace used for melting reactive metals, e.g., a cold mold furnace. The furnace 10 comprises a gas tight housing 11 which encloses a conductive mold 12 which may, for example, be made of copper. The mold 12 contains the metal 13 which is to be melted, the upper surface of the metal 13 being adjacent the bottom end of an electrode 14. Although only one electrode 14 has been illustrated in Fig. 1, it will be apparent that a greater number of electrodes may be employed.

The electrode 14 extends outwardly from the housing 11 and its upper end is engaged by an electrode drive device 15 which may be of any conventional type. The drive device 15 is operable by a reversible motor 16 which is controlled by controlling apparatus 17 of any well known type having contactor operating relay coils 19 and 20. Thus, when coil 19 is energized, the motor 16 is connected to its energizing source in such a manner that the electrode 14 is moved upwardly by the drive device 15, and when the coil 20 is energized, the motor 16 is connected so that it will cause the electrode 14 to move downwardly.

Gases may be exhausted from and admitted to the housing 11 by means of the pipes 21 and 22 so that the metal 13 may be melted in a low pressure, inert atmosphere within the mold 12. The electrode 14 is connected to an electrical power source by means of a cable 23 secured to the terminal 35 on clamp 24 attached to the electrode 14, and the housing 11, which is conductive and which is conductively connected to the mold 12, is connected to the other terminal of the power source by means of a cable 25 secured to the terminal 26. For example, the cable 23 may be connected to the negative terminal of a direct current generator (not shown) whereas cable 25 may be connected to the positive terminal of such generator. Clamp 24 has a bracket 27 of insulating material attached thereto, which bracket 27 is engageable with limit switches 28 and 29 whose functions are hereinafter described.

As mentioned above, in the preferred embodiment of the invention the lower end of the electrode 14 is periodically moved toward the upper surface of the metal 13 and then withdrawn a predetermined distance therefrom. Accordingly, the preferred embodiment of the regulating apparatus of the invention comprises a timer 30 which intermittently connects the down coil 20 to its energizing power source 31. As a result, the motor 16 will be intermittently energized for a predetermined length of time causing the drive device 15 to move the lower end of the electrode 14 toward the surface of the metal 13. The speed of rotation of the motor 16 and the reduction ratio of the drive device 15 are so selected that the electrode 14 will move downwardly at a rate which is greater than the rate at which electrode 14 is consumed so that if the downward movement of the electrode 14 is not interrupted the end of the electrode 14 will engage the upper surface of the metal 13. Prior to setting the timer 30 into operation, an arc may be struck between the lower end of the electrode 14 and the upper surface of the metal 13 by first closing the manual switch 32 which energizes the down coil 20 and moves the electrode 14 downwardly, the striking of an arc being observed visually through a sight tube 33, and after the arc is struck, the electrode 14 is moved upwardly a short distance by operation of the manual switch 34, the operation of which causes energization of the up coil 19. Alternatively, the timer 30 may be energized after arc voltage source is connected to the terminals 26 and 35, an arc being struck when the electrode 14 is moved close to the metal 13 by the timer 30 and the apparatus controlled thereby.

When the lower end of the electrode is brought within a short distance of the upper surface of the metal 13, molten metal droplets, which move about immediately below the end of the electrode 14, during melting, cause momentary short circuits between the end of the electrode 14 and the upper surface of the metal 13. Such droplets produce relatively large momentary decreases in the voltage between the clamp 24 and the terminal 26. For example, if the normal voltage between the terminal 35 on the clamp 24 and the terminal 26 during melting is approximately 30 volts, the voltage between terminals 26 and 35 may decrease to approximately 15 to 20 volts for periods varying from 0.1 to 0.3 second when metal droplets span the gap between the lower end of the electrode 14 and the upper surface of the metal 13. As pointed out above, such droplets lower the voltage between the terminals 35 and 26 by a greater amount than volatile impurities, changes in gas pressure or composition and arcing to the wall of the mold 12.

Low voltage responsive apparatus 36 which may, for example, be set to respond when the voltage between the terminals 35 and 26 is below approximately 26 volts, is connected to the terminals 35 and 26 by means of leads 37 and 38. The low voltage responsive apparatus 36 is connected to a second timer 39 which is set into operation whenever the apparatus 36 is operated. The timer 39, when energized, connects the up coil 19 to the source 31 and at the same time energizes the relay coil 40 which operates the armature 41, breaking the energizing circuit for the down coil 20 in an obvious manner. Thus, the timer 39 energizes the up coil 19, and if the timer 30 at this time still completes an energizing circuit for the down coil 20, the energizing circuit for the down coil 20 is interrupted because of the energization of the coil 40. Therefore, the motor 16 operates the drive device 15 in a direction which will cause the electrode 14 to move upwardly away from the surface of the metal 13, and the distance that the electrode will move away from the surface of the metal 13 will be determined by the period of operation of the timer 39. By suitable adjustment of the cycle of operation of the timer 39, the electrode 14 may be moved any desired distance away from the upper surface of the metal 13, and preferably, it is set so that the timer 39 breaks the energizing circuit for the up coil 19 after the electrode 14 has moved approximately from one-quarter of an inch to two inches upwardly from the position it occupied when the timer 39 was first energized by the low voltage responsive apparatus 36.

If, because of the operation of the timer 39, the electrode 14 has been moved upwardly a distance sufficient to prevent continued operation of the low voltage responsive apparatus 36, the down coil 20 will be energized immediately or shortly after the timer 39 interrupts the energizing circuit for the up coil 19, depending upon the relationship of the cycles of operation of the timers 30 and 39. Therefore, the electrode 14 will again be moved downwardly and the cycle of operation just described will be repeated. The timer 30 may, for example, be set to operate once every ten seconds, but if desired, it may be set so as to operate either more or less frequently.

The apparatus of the invention may also comprise a high voltage responsive apparatus 142 which also is connected to the terminals 35 and 26 by means of the leads 37 and 38. The apparatus 142 is adjusted to respond when the voltage between the terminals 35 and 26 exceeds the normal operating arc voltage by a predetermined amount. For example, the apparatus 142 may be set to respond when the voltage between the terminals 35 and 26 exceed approximately 34 volts, the normal operating arc voltage being approximately 30 volts. When the apparatus 142 is so adjusted and the arc voltage exceeds approximately 34 volts, the apparatus 142 completes an energizing circuit for the down coil 20 causing the electrode 14 to move downwardly toward the upper surface of the metal 13 until the arc voltage is decreased below approximately 34 volts. The apparatus 142 provides an additional control over the positioning of the electrode 14, but, if desired, may be omitted.

If the rate at which the electrode 14 is movable downwardly by the motor 16 and the drive device 15 is properly selected, i.e., exceeds the rate at which the electrode 14 is consumed by at least a small amount, the timer 30 may also be omitted. In this case, after the arc is struck between the electrode 14 and the surface of the metal 13, the switch 32 may be closed manually causing the electrode 14 to move continuously toward the surface of the metal 13. However, as described above, when the gap between the lower end of the electrode 14 and the upper surface of the metal 13 is bridged by metal droplets, the apparatus 36 will respond and will cause operation of the timer 39 which in turn will open the energizing circuit for the down coil 20 and will complete an energizing circuit for the up coil 19. Therefore, the electrode 14 will then move upwardly a distance dependent upon the time of operation of the timer 39, and when the operation of the timer 39 is completed, the electrode 14 will again move downwardly immediately, unless, of course, metal droplets still cause the apparatus 36 to respond. Therefore, it will be apparent that when the timer 30 is omitted and the switch 32 is maintained in its closed position, the electrode 14 will be reciprocated in an up and down direction at a frequency which is dependent substantially on the rate at which the electrode 14 is driven downwardly by the motor 16 and the drive device 15 and by the length of the cycle of operation of the timer 39. In this mode of operation it has proven desirable to employ a drive motor for which the up speed exceeds the down speed.

The mode of operation just described will maintain a short arc varying in length from that obtained at the end of the period of operation of timer 39 to that at which droplets of metal cause a momentary short circuit. Such a short arc gives high melting efficiency but it is often desirable to maintain a longer arc as for example to improve ingot surface. For this latter type of operation, the timer 30 should provide for a periodic down movement which continues until the low voltage control operates when the electrode is again raised. For example, if the electrode melting rate were ¼ inch per minute, timer 39 could be set to raise the electrode 1¼ inches and timer 30 to respond every minute. A minute after the operation of timer 39 the arc gap would be slightly less than 1½ inches. The electrode would then move down until the drops caused a momentary short circuit. If the electrode drive device 15 and the speed of the motor 15 are so selected, this movement would require slightly more than two seconds and the up movement slightly less than two seconds. The arc gap is therefore maintained within the range 1¼ to 1½ inches for approximately 56 seconds out of each minute.

Closer control of arc length can be obtained by combining both modes of operation through the use of a second timer 30a. Timer 30 would then be set to operate as first described to lower the electrode every ten seconds an amount equal to the difference between the electrode melting rate and the rate of rise of the pool. The second timer 30a would be set to operate every minute to provide a continuous down movement until droplets of metal caused momentary short circuits between the electrode and bath. An arc gap of very uniform length would therefore be maintained irrespective of melting rate and pressure variations in the furnace. Of course, if this feature of the invention is not desired, the timer 30a may be omitted.

Fig. 2 is an electrical circuit diagram of one form of the preferred embodiment of the invention. In Fig. 2, the circuits corresponding to the components of the regulating apparatus shown in Fig. 1 have been enclosed by dotted line rectangles labeled with the corresponding reference numerals. Energization of the regulating apparatus is controlled by the switch 49 which, in the closed position, supplies electrical energy to the various circuits from the source 31 over the leads 50 and 51.

The low voltage responsive apparatus 36 comprises a relay coil 42 which operates an armature 43 and a relay coil 44 which operates armatures 45 and 46. Relay coil 42 is connected in series with resistors 47 and 48 to the terminals 35 and 26 of the furnace by means of leads 37 and 38, and therefore energization of the coil 42 is controlled by the voltage of the arc between the electrode 14 and the surface of the metal 13. When the voltage between the terminals 35 and 26 has a value which indicates that a proper arc exists between the electrode 14 and the metal 13, the relay coil 42 maintains the armature 43 out of contact with its associated contact, and the value of the voltage at which the armature 43 is permitted to fall back against its contact may be set by means of variable resistors 47 and 48. When the armature 43 is released by the coil 42, it engages its associated contact and completes an energizing circuit for the coil 44 from lead 50 to lead 51 by way of lead 52, armature 43, lead 53, coil 44 and lead 54. When relay coil 44 is energized, the armatures 45 and 46 engage their associated contacts, armature 45 completing an energizing circuit for the up coil 19 as follows: lead 55 connected to one terminal of the source 31, switch 49, leads 51 and 54, armature 45, lead 56, normally closed limit switch 28, coil 19 and lead 57 connected to the other terminal of the source 31. As pointed out above, energization of the coil 19 causes the electrode 14 to move upwardly away from the surface of the metal 13.

Armature 46 completes an energizing circuit for the timer 39. The energizing circuit for the timer 39 extends from lead 50 to lead 51 as follows: lead 58 connected to lead 50, armature 46, leads 59 and 60, lead 66, clutch magnet 64 which connects a motor 65 to the timing mechanism which opens the normally closed switch 63 after a predetermined interval of time, lead 67 and lead 54 connected to the lead 51. A holding circuit also is completed as follows: lead 60, relay coil 61, lead 62, armature 63 and lead 54 connected to the lead 51.

When the coil 61 is energized as described, the armatures 68 and 69 associated therewith are pulled up against their associated contacts, and a holding or locking circuit for the coil 61 and the clutch magnet 64 is completed by way of a lead 70 connected to the lead 58 and to the armature 68 as follows: leads 50, 58 and 70, armature 68, and then in parallel through lead 66, clutch magnet 64 and leads 67, 54 and 51 and through coil 61, lead 62, armature 63 and leads 54 and 51. Armature 69 completes a holding circuit for the relay coil 44 as follows: lead 58 connected to lead 50, armature 46, lead 59, armature 69, leads 71 and 53, coil 44, and lead 54 connected to lead 51.

After a predetermined interval of time determined by the setting of the timing mechanism of the timer 39, the switch 63 is opened breaking the holding circuits for the coils 61 and 44 and for the magnet 64. During such interval of time, the up coil 19 has been energized causing upward movement of the electrode 14, and if at the time that the switch 63 is opened the electrode 14 has moved away from the surface of the metal 13 a distance sufficient to prevent the production of momentary short circuits by metal droplets between the lower end of the electrode 14 and the surface of the metal 13, relay coil 42 will be energized sufficiently to pull the armature 43 out of engagement with its contact. For this reason the relay coil 44 will not be re-energized, and the circuit for the up coil 19 will be broken causing the upward movement of the electrode to cease.

If, as in one of the embodiments described above, the manually operable switch 32 has been closed, an energizing circuit for the down coil 20 is completed as follows: lead 72 connected to lead 51, switch 32, lead 73, armature 41 and its associated contact, lead 74, limit switch 29, coil 20, and lead 57 connected to the power source 31. During the time that the coil 19 was energized as described above, the just described energizing circuit for the coil 20 was interrupted at the armature 41 because relay coil 40 was energized by way of leads 75 and 76 connected respectively to leads 56 and 50. Thus, relay coil 40 is energized at the same time that the up coil 19 is energized.

If the switch 32 is closed at the time that the up coil 19 becomes de-energized, the electrode 14 will immediately commence to move toward the upper surface of the metal 13 and will continue such movement until metal droplets in the gap between the lower end of the electrode 14 and the upper surface of the metal 13 again cause momentary short circuits therebetween. At this time the armature 43 will again fall back against its contact causing the above described cycle of operations to be repeated.

However, in the preferred embodiment of the invention the switch 32 is maintained in its open position, and movement of the electrode 14 in the downward direction after the up coil 19 is de-energized is controlled by the timer 30 which preferably comprises two timing devices, the timing device in the left portion in the rectangle 30 being identical with the timer 39 and the timing device in the right portion of the rectangle 30 being a continuously running timing device. The latter timing device comprises a continuously operating motor 77 connected to the leads 50 and 51 by leads 78 and 79 which motor drives a cam 80 which intermittently operates a switch 81. When the switch 81 is closed by the cam 80, energizing circuits for the relay coil 82 and the clutch magnet 83 are completed as follows: for the coil 82, lead 79 connected to lead 51, switch 84, leads 84 and 85, coil 82, lead 86, switch 87, lead 88, and lead 78 connected to lead 50; for the magnet 83, lead 84, clutch magnet 83, and lead 88. Energization of the coil 82 causes the armatures 89 and 90 to pull up against their associated contacts, armature 90 completing obvious holding circuits for the coil 82 and the clutch magnet 83. Armature 89 completes an energizing circuit for the down coil 20 as follows: lead 79 connected to the lead 51, lead 91, armature 89, lead 92, armature 41, lead 74, limit switch 29, down coil 20, and lead 57 connected to the source 31. Down coil 20 will remain energized for an interval of time determined by the setting of the mechanism associated with the motor 93, the energizing circuit for the coil 82 and, hence, the energizing circuit for the coil 20 being broken by opening of the switch 87 which is operated by the motor 93 and its associated timing mechanisms.

During the time that the down coil 20 is energized, the electrode 14 will move downwardly toward the metal 13. If the extent of downward movement is not sufficient to cause momentary short circuits between the lower end of the electrode 14 and the upper surface of the metal 13, as described above, downward movement of the electrode 14 will stop when the down coil 20 becomes de-energized and nothing further will happen until the switch 81 is again closed by the cam 80. However, if metal droplets short circuit the electrode 14 to the metal 13 either during the time that the electrode 14 is being moved downwardly because of energization of the down coil 20 or at any time thereafter, the above described circuits for causing upward movement of the electrode 14 will take control of the movement of the electrode 14 causing it to move away from the metal 13 by a predetermined distance. It will be noted that the relay coil 40 interrupts the circuits for causing downward movement of the electrode 14 whenever the armature 43 is released by the coil 42, the armature 43 completing circuits for energization of the coil 40 and the up coil 19.

If it is desired to include the timer 30a for the purpose of providing operation of the type described above, the timer 30a may comprise a continuously operating motor 110 connected to the power leads 50 and 51 by leads 111 and 112. The motor 110 drives a cam 113 which periodically operates a switch 114. When the switch 114 is closed by the cam 113, it completes an energizing circuit for the relay coil 115 as follows: lead 116 connected to power lead 51, switch 114, relay coil 115, lead 117, armature 118 and lead 119 connected to the other power lead 50. When the relay coil 115 is energized, it operates its two associated armatures 120 and 121 completing an energizing circuit for the down coil 20 by way of the armature 120, leads 122, 92 and 73, armature 41, lead 74 and limit switch 29. When operated, armature 121 completes a holding circuit for the relay coil 115 extending from the power lead 51 to the power lead 50 by way of lead 116, armature 121, relay coil 115, lead 117, armature 118 and lead 119. Accordingly, the energizing circuit for the down coil 20 remains completed until the relay coil 40 is energized as described above or the holding circuit for the relay coil 115 is broken. The holding circuit is broken when the relay coil 123, which operates armature 121, is energized, and relay coil 123, which is connected between leads 50 and 56, is energized at the same time that the relay coil 40 is energized in the manner described above, namely, when the spacing between the electrode 14 and the surface of the molten metal is such that molten droplets of metal falling between the electrode 14 and the molten metal 13 cause momenary short circuits.

The high voltage responsive apparatus 40 may comprise a relay coil 94 which controls the position of an armature 95, the armature 95 normally being out of engagement with its associated contact. The relay coil 94 is connected through a pair of adjustable resistors 96 and 97 to the terminals 35 and 26 of the furnace, and therefore, energization of the coil 94, and hence, operation of the armature 95 is controlled in accordance with the voltage between the terminals 35 and 26. The resistors 96 and 97 may be adjusted so that the armature 95 does not engage its contact until the voltage between the terminals 35 and 26 exceeds the normal arc voltage by a predetermined amount. For example, in installations where the normal arc voltage is approximately 30 volts, the resistors 96 and 97 may be set so that the armature 95 engages its contact when the arc voltage exceeds approximately 34 volts. It will be noted that the armature 95 and its associated contact are connected in parallel with the switch 32, and therefore, when the armature 95 is drawn up against its contact by the relay coil 94, the down coil 20 will be energized in the same manner that it is energized by closing of the switch 32. It will be apparent, therefore, that when the arc voltage exceeds the desired operating voltage by a predetermined amount the down coil 20 will be energized causing the electrode 14 to move downwardly toward the upper surface of the metal 13. However, when the arc voltage decreases, because of the downward movement of the electrode 14, below the value of voltage at which the relay coil 94 and armature 95 are set to operate, the armature 95 will be released, stopping further downward movement of the electrode 14.

The voltage between the terminals 35 and 26 may be observed visually by means of a meter 98 connected between these terminals, and the motor control apparatus 17 may include a pair of manually operable switches 99 and 100 which may be employed to manually raise or lower the electrode 14. It will be noted that the switch 100 when operated completes an obvious circuit for energization of the up coil 19, and the switch 99 when operated completes an obvious circuit for energization of the down coil 20. Limit switches 28 and 29 disposed as indicated in Fig. 1 are employed to limit respectively the up and down movements of the electrode 14 so as to prevent damage to the apparatus in the event of failure of one of the automatic regulating circuits.

Although the preferred embodiment of the invention described above the voltage responsive devices are relays, it will be apparent to those skilled in the art that other well known types of voltage responsive devices may be substituted for such relays.

As used in the appended claims, the expression "low pressure, substantially inert atmosphere" is intended to include either a vacuum or an inert gas under low pressure.

Having thus described my invention with particular reference to the preferred form thereof and having described certain modifications, it will be obvious to those skilled in the art to which the invention pertains, after understanding my invention, that various changes and other modifications may be made therein without departing from the spirit and scope of my invention, as defined by the claims appended thereto.

What is claimed is:

1. Electrode control apparatus for maintaining an arc gap within a desired range in an arc furnace having a consumable electrode and having means for melting said electrode in a low pressure, substantially inert atmosphere to form a molten pool of the material of said electrode in said furnace, said apparatus comprising means for moving said electrode toward said pool at a rate which is at least equal to the difference between the melting rate of said electrode and the rate of rise of said pool and means operable by molten drops of said material between said electrode and said pool in a predetermined position of said electrode with respect to said pool for moving said electrode away from said pool a predetermined distance.

2. Electrode control apparatus for maintaining an arc gap within a desired range in an arc furnace having a consumable electrode and having means for melting said electrode in a low pressure, substantially inert atmosphere to form a molten pool of the material of said electrode in said furnace, said apparatus comprising means for moving said electrode toward said pool at a rate which is at least equal to the difference between the melting rate of said electrode and the rate of rise of said pool and means controlled by the voltage between said electrode and said pool and operable when molten drops of said material between said electrode and said pool in a predetermined position of said electrode with respect to said pool cause momentary short circuits between said electrode and said pool, for moving said electrode away from said pool a predetermined distance.

3. Electrode control apparatus for maintaining an arc gap within a desired range in an arc furnace having a consumable electrode and having means for melting said electrode in a low pressure, substantially inert atmosphere to form a molten pool of the material of said electrode in said furnace, said apparatus comprising means for moving said electrode toward said pool at a rate which is at least equal to the difference between the melting rate of said electrode and the rate of rise of said pool and electrically operable means connected to said electrode and said pool and operable when the voltage between said electrode and said pool is reduced to a value which is small in relation to the normal arc voltage for moving said electrode away from said pool a predetermined distance.

4. Electrode control apparatus for maintaining an arc gap within a desired range in an arc furnace having a consumable electrode and having means for melting said electrode to form a molten pool of the material of said electrode in said furnace, said apparatus comprising means for periodically moving said electrode rapidly toward said pool and means operable by molten drops of said material between said electrode and said pool in a predetermined position of said electrode with respect to said pool for moving said electrode rapidly away from said pool a predetermined distance.

5. Electrode control apparatus for maintaining an arc gap within a desired range in an arc furnace having a consumable electrode and having means for melting said electrode in a low pressure, substantially inert atmosphere to form a molten pool of the material of said electrode in said furnace, said apparatus comprising means for moving said electrode toward said pool at a rate which is at least equal to the difference between the melting rate of said electrode and the rate of rise of said pool, means for periodically moving said electrode toward said pool at a higher rate and means operable when molten drops of said material between said electrode and said pool in a predetermined position of said electrode with respect to said pool cause momentary short circuits between said electrode and said pool for moving said electrode rapidly away from said pool a predetermined distance.

6. Electrode control apparatus as claimed in claim 5 in which said means for moving said electrode away from said pool comprises voltage responsive means connected to said electrode and to said pool.

7. Means for regulating the spacing between an electrode and the molten material in an arc melting furnace having an electrical energy source connected to said electrode and said material comprising means for moving said electrode toward and away from said material, first means independent of the voltage between said electrode and said material for causing said moving means to move said electrode toward said material periodically, and second means controlled by the voltage between said electrode and said material for causing said moving means to move said electrode away from said material when said voltage is less than a predetermined value.

8. Means for regulating the spacing between an electrode and the molten material in an arc melting furnace having an electrical energy source connected to said electrode and said material comprising means for moving said electrode toward and away from said material, first means independent of the voltage between said electrode and said material for causing said moving means to move said electrode toward said material periodically, second means controlled by the voltage between said electrode and said material for causing said moving means to move said electrode away from said material when said voltage is less than a predetermined value, and third means controlled by said second means for preventing operation of said first means.

9. Means for regulating the spacing between an electrode and the molten material in an arc melting furnace having an electrical energy source connected to said electrode and said material comprising means for moving said electrode toward and away from said material, first means for causing said moving means to move said electrode continuously toward said material, second means controlled by the voltage between said electrode and said material for causing said moving means to move said electrode away from said material when said voltage is less than a predetermined value, and third means controlled by said second means for preventing operation of said first means.

10. Means for regulating the spacing between an electrode and the molten material in an arc melting furnace having an electrical energy source connected to said electrode and said material comprising means for moving said electrode toward and away from said material, first means for causing said moving means to move said electrode toward said material, second means controlled by the voltage between said electrode and said material for causing said moving means to move said electrode away from said material a predetermined distance when said voltage is less than a predetermined value, and third means controlled by said second means for preventing operation of said first means.

11. Means for regulating the spacing between an electrode and the molten material in an arc melting furnace having an electrical energy source connected to said electrode and said material comprising means for moving said electrode toward and away from said material, first means for causing said moving means to move said electrode toward said material, second means controlled by the voltage between said electrode and said material for causing said moving means to move said electrode toward said material when said voltage exceeds a predetermined value, third means controlled by the voltage between said electrode and said material for causing said moving means to move said electrode away from said material a predetermined distance when said voltage is less than a predetermined value, and fourth means controlled by said third means for preventing operation of said first means.

12. Arc melting furnace apparatus comprising: a mold adapted to contain molten metal, an electrode extending within said mold, first means for connecting said electrode to a source of electrical energy and second means for connecting said source to said metal for producing an arc between said electrode and said metal, and drive means connected to said electrode for moving said electrode toward and away from the metal in said mold, said drive means having first and second coils which, when energized, will cause said drive means to move said electrode toward and away from said metal, respectively; first relay means connected to said electrode and said second means, said relay means being responsive when the voltage between said second means and said electrode is lowered below a predetermined value by metal droplets between said electrode and said metal, and timing means controlled by said relay means and connected to said second coil for energizing said second coil for a predetermined length of time after response of said relay means; means connected to said first coil for energizing said first coil; and second relay means connected to and controlled by said timing means and connected in circuit with said means for energizing said first coil for interrupting the energizing circuits for said first coil during the time that said second coil is energized by said timing means.

13. Arc melting furnace apparatus comprising: a mold adapted to contain molten metal, an electrode extending within said mold, first means for connecting said electrode to a source of electrical energy and second means for connecting said source to said metal for producing an arc between said electrode and said metal, and drive means connected to said electrode for moving said electrode toward and away from the metal in said mold, said drive means having first and second coils which, when energized, will cause said drive means to move said electrode toward and away from said metal, respectively; first relay means connected to said electrode and said second means, said relay means being responsive when the voltage between said second means and said electrode is lowered below a predetermined value by metal droplets between said electrode and said metal, and first timing means controlled by said relay means and connected to said second coil for energizing said second coil for a predetermined length of time after response of said relay means; second timing means connected to said first coil for energizing said first coil for a predetermined length of time, said second timing means including means for intermittently operating said second timing means; and second relay means connected to and controlled by said first timing means and connected in circuit with said second timing means for interrupting the energizing circuits for said first coil during the time that said second coil is energized by said first timing means.

14. Arc melting furnace apparatus comprising: a mold adapted to contain molten metal, an electrode extending within said mold, first means for connecting said electrode to a source of electrical energy and second means for connecting said source to said metal for producing an arc between said electrode and said metal, and reversible electric drive means connected to said electrode for moving said electrode toward and away from the metal in said mold, said drive means having first and second coils which, when energized, will cause said drive means to move said electrode toward and away from said metal, respectively; first relay means connected to said electrode and said second means, said relay means being responsive when the voltage between said second means and said electrode is lowered below a predetermined value by metal droplets between said electrode and said metal, and first timing means controlled by said relay means and connected to said second coil for energizing said second coil for a predetermined length of time after response of said relay means; second timing means connected to said first coil for energizing said first coil for a predetermined length of time, said second timing means including means for intermittently operating said second timing means; second relay means connected to said electrode and said second means, said second relay means being connected to said first coil and being responsive to voltages exceeding a predetermined value greater than the normal operating voltage between said electrode and said second means for energizing said first coil; and third relay means connected to and controlled by said first timing means and connected in circuit with said second relay means and said second timing means for interrupting the energizing circuits for said first coil during the time that said second coil is energized by said first timing means.

References Cited in the file of this patent
UNITED STATES PATENTS 2,798,107   Boron et al. _____ July 2, 1957